(12) United States Patent
Kapala

(10) Patent No.: US 9,644,640 B2
(45) Date of Patent: May 9, 2017

(54) COMPRESSOR NOZZLE STAGE FOR A TURBINE ENGINE

(75) Inventor: Patrick Edmond Kapala, Villevaude (FR)

(73) Assignee: SNECMA, Paris (FR)

(*) Notice: Subject to any disclaimer, the term of this patent is extended or adjusted under 35 U.S.C. 154(b) by 1035 days.

(21) Appl. No.: 13/362,464

(22) Filed: Jan. 31, 2012

(65) Prior Publication Data

US 2012/0195745 A1 Aug. 2, 2012

(30) Foreign Application Priority Data

Feb. 2, 2011 (FR) ...................................... 11 50824

(51) Int. Cl.
*F01D 11/00* (2006.01)
*F04D 29/54* (2006.01)
*F01D 9/04* (2006.01)
*F04D 29/08* (2006.01)
*F04D 29/64* (2006.01)

(52) U.S. Cl.
CPC ............ *F04D 29/542* (2013.01); *F01D 9/041* (2013.01); *F01D 11/001* (2013.01); *F04D 29/083* (2013.01); *F04D 29/644* (2013.01); *F05D 2230/232* (2013.01); *F05D 2230/237* (2013.01); *F05D 2260/96* (2013.01); *Y02T 50/673* (2013.01)

(58) Field of Classification Search
CPC ....... F01D 11/001; F01D 11/003; F01D 11/02
USPC ... 415/110, 173.7, 174.4, 174.5, 209.3, 230; 416/174
See application file for complete search history.

(56) References Cited

U.S. PATENT DOCUMENTS

| | | | | |
|---|---|---|---|---|
| 2,812,159 A | * | 11/1957 | Krebs | 415/119 |
| 3,326,523 A | * | 6/1967 | Bobo | 415/209.3 |
| 4,621,976 A | * | 11/1986 | Marshall et al. | 415/191 |
| 4,655,683 A | * | 4/1987 | Chaplin | 415/137 |
| 4,721,434 A | * | 1/1988 | Marshall et al. | 415/119 |
| 4,767,267 A | * | 8/1988 | Salt et al. | 415/173.7 |
| 4,820,119 A | * | 4/1989 | Joyce | 415/173.7 |
| 4,897,021 A | * | 1/1990 | Chaplin et al. | 415/173.7 |
| 4,986,737 A | * | 1/1991 | Erdmann | 416/190 |
| 5,215,432 A | * | 6/1993 | Pickering et al. | 415/119 |
| 5,346,362 A | | 9/1994 | Bonner et al. | |
| 5,429,479 A | * | 7/1995 | Cordier | 415/209.3 |
| 5,681,142 A | * | 10/1997 | Lewis | 415/119 |
| 5,749,701 A | * | 5/1998 | Clarke et al. | 415/115 |

(Continued)

FOREIGN PATENT DOCUMENTS

EP 1 441 108 7/2004
EP 1 870 562 12/2007

(Continued)

OTHER PUBLICATIONS

Preliminary Search Report issued Sep. 30, 2011 in French Patent Application No. 1150824 with English-language translation of category).

*Primary Examiner* — Sean J Younger
(74) *Attorney, Agent, or Firm* — Oblon, McClelland, Maier & Neustadt, L.L.P.

(57) ABSTRACT

A single-piece compressor nozzle stage for a turbine engine, the stage including two coaxial rings, connected together by radial vanes, the inner ring including an annular cavity for housing a damper for damping vibration by friction, which damper is secured to an annular abradable-material support.

8 Claims, 3 Drawing Sheets

(56) References Cited

U.S. PATENT DOCUMENTS

| | | | |
|---|---|---|---|
| 6,042,334 A * | 3/2000 | Schilling | 415/173.7 |
| 6,139,264 A * | 10/2000 | Schilling | 415/174.2 |
| 6,901,821 B2 * | 6/2005 | Torrance et al. | 74/574.4 |
| 7,291,946 B2 * | 11/2007 | Clouse et al. | 310/51 |
| 2004/0145251 A1 | 7/2004 | Clouse et al. | |
| 2007/0297900 A1 | 12/2007 | Abgrall et al. | |
| 2008/0008582 A1* | 1/2008 | Pickens et al. | 415/174.2 |
| 2011/0044798 A1* | 2/2011 | Digard Brou De Cuissart et al. | 415/115 |
| 2011/0052380 A1* | 3/2011 | Bariaud et al. | 415/182.1 |
| 2011/0127352 A1* | 6/2011 | Fachat et al. | 239/265.15 |

FOREIGN PATENT DOCUMENTS

| | | |
|---|---|---|
| FR | 2 902 843 | 12/2007 |
| FR | 2 948 736 | 2/2011 |
| FR | 2 948 737 | 2/2011 |
| FR | 2 958 323 | 10/2011 |
| WO | WO 2010/130959 | 11/2010 |

* cited by examiner

COMPRESSOR NOZZLE STAGE FOR A TURBINE ENGINE

FIELD OF THE INVENTION

The present invention relates to a compressor nozzle stage for a turbine engine, in particular for a low pressure or high pressure compressor of a turbine engine.

A turbine engine compressor comprises at least one nozzle stage comprising two coaxial rings extending one inside the other with substantially radial vanes extending between them, the vanes being connected at their ends to the rings.

In operation, the vanes of a nozzle stage are subjected to vibration that can damage them in fatigue and that can give rise to cracks appearing, or even to the vanes breaking. When the radial ends of the vanes are embedded in the inner and outer rings, vibratory stresses become concentrated in the vanes and high dynamic stresses usually appear in the proximity of the places where the vanes are embedded.

One solution for remedying that problem consists in installing vibration damper means in association with the inner ring and/or the outer ring of the nozzle stage. It is not possible to modify the profile of the vanes in order to limit such vibration or to limit the effects thereof, since the profile is already optimized for performing an aerodynamic function.

By way of example, it is known to seal the radial ends of the vanes in corresponding housings in the inner and outer rings by means of a silicone-based resin for the purpose of damping vibration. Nevertheless, such sealing resins do not withstand temperatures higher than 260° C.

BACKGROUND OF THE INVENTION

Documents FR-A1-2 902 843, FR-A1-2 948 736, and FR-A1-2 948 737 in the name of the Applicant also disclose nozzle stages in which the outer rings are sectorized and include vibration damper means interposed between the sectors of the outer rings.

Nevertheless, in certain circumstances, it is not possible to sectorize an outer ring of a nozzle stage since the ring constitutes a portion of structural casings that are subjected to pressure and that must remain completely leaktight and rigid. This applies for example to outer rings that include annular fastening flanges at their upstream and downstream ends for fastening to other flanges by nut-and-bolt type means.

Document FR 10/01296 also discloses a nozzle stage in which the inner ring comprises two coaxial portions that extend one inside the other and that define between them an annular cavity for housing vibration damper means. The damper means are formed by elastomer spacers. The inner and outer portions of the inner ring are fastened together by nut-and-bolt type means, and the inner portion is used as a support for blocks of abradable material that are to co-operate with annular wipers of the rotor of the compressor by rubbing against them.

That solution is not always possible, in particular for engines of small size, since the radial distance between the inner portion and the wipers of the rotor is small and cannot accommodate mounting nut-and-bolt type means. Furthermore, the above-mentioned elastomer spacers do not withstand very high temperatures.

The present invention provides a solution to those drawbacks, which solution is simple, effective, and inexpensive.

OBJECT AND SUMMARY OF THE INVENTION

A particular object of the invention is to provide novel means for damping vibration in a nozzle stage and to integrate such damper means in an engine of small size. Another object of the invention is to provide such means for a nozzle stage that is constituted by a complete annulus, i.e. that is not made up of juxtaposed sectors or vanes.

To this end, the invention provides a compressor nozzle stage for a turbine engine, the stage comprising two coaxial rings, respectively an inner ring and an outer ring, that are connected together by substantially radial vanes, and an annular support of abradable material that is fastened to the inner ring, wherein the nozzle stage comprises a single or non-sectorized piece and its inner ring includes an annular cavity that is radially open towards the inside and in which there are received damper means for damping vibration by friction, which means are mounted with prestress in said cavity and carry the annular support of abradable material.

In the nozzle of the invention, the friction damper means serve to dissipate a portion of the vibration energy to which the vanes are subjected in operation. In operation, the vanes are subjected to vibration modes, in particular in twisting about their axes, which modes give rise to relative micro-movements between the inner ring and the damper means, giving rise to the damper means rubbing against the inner ring, and to a portion of the vibration energy being dissipated by friction.

The damper means are advantageously held captive in the annular cavity of the inner ring and cannot escape therefrom in operation. They are of the non-removable type and it is necessary to destroy the damper means and also the abradable-material support in order to replace the abradable material if it becomes worn.

The damper means may be fastened by brazing, welding, or adhesive to the abradable-material support.

According to another characteristic of the invention, the damper means and the annular abradable-material support are mounted inside the annular cavity of the inner ring by movement in axial translation, and they are held axially in said annular cavity by an axial abutment of the inner ring.

Advantageously, the damper means also form means for resiliently snap-fastening the damper means in the annular cavity of the inner ring, said damper means being deformable between a position in which they are compressed radially inwards, in which position they can be mounted by being moved in axial translation into the annular cavity, and a position in which they are deployed radially outwards, in which position they are in radial prestress against the inner ring and can come into axial abutment inside the internal cavity.

The damper means are mounted in simple manner by being moved in axial translation over the inner ring until the damper means take up the deployed position inside the annular cavity and form abutment means that limit movements relative to the inner ring in an axial direction, in particular downstream. The abradable-material support is then in abutment against corresponding means of the inner ring in order to limit movements in the opposite axial direction.

Preferably, the inner ring includes a radially-inner annular rim or shoulder with which the damper means and the abradable-material support can co-operate by abutment in an axial direction.

In the mounted position, the abradable-material support preferably bears axially upstream against said shoulder. Most of the pressure forces are applied in normal operation against the abradable-material support in the upstream direction. Axial clearance for assembly is acceptable between the shoulder and the damper means, since the damper means should come into abutment against the shoulder only during abnormal operation.

Advantageously, the damper means comprise a sheet metal part of section that is substantially C-shaped, having two substantially cylindrical walls parallel to the axis of the nozzle, the inner cylindrical wall being fastened to the abradable-material support and the outer cylindrical wall being pressed with radial prestress against the inner ring, the part being elastically deformable in a radial direction. This metal part withstands high temperatures well, and in particular withstands temperatures higher than 320° C.

In the unstressed state, the sheet metal part has an outside diameter that is greater than the inside diameter of the surface of the inner ring against which the sheet metal part bears.

The outside wall of the part may include radial notches and/or slots that are regularly distributed around the axis of the nozzle, and that define between them tabs for bearing and rubbing against the inner ring, the tabs being designed to be applied thereagainst with pressure. The notches or slots serve to increase the radial flexibility of the outer wall of the sheet metal part, and also to define contact pressure against the inner ring, thereby improving the effectiveness of the damping. The notches in the outer wall of the sheet metal part may be in festoon form, for example.

The part may include at least one radial slot extending over its entire axial dimension, and may have an inside diameter, when in a non-stressed state, that is less than the outside diameter of the abradable-material support. Under such circumstances, the sheet metal part is also mounted with radial prestress against the abradable-material support. The sheet metal part extends over 360° and in this example is of the type that is split or open (at one point of its circumference).

The inner ring may have centering cylindrical bearing surfaces at its upstream and downstream ends that co-operate with complementary cylindrical bearing surfaces of the abradable-material support. This centering ensures that the abradable-material support is positioned radially and prevented from moving radially relative to the inner ring.

The inner ring may also include anti-rotation means co-operating by abutment in a circumferential direction with the abradable-material support or with means carried thereby to prevent it from moving in rotation about the axis of the nozzle. The anti-rotation means may be of the peg, stop, or dog type. Preferably, the anti-rotation means co-operate with one another with a small amount of circumferential clearance so as to avoid impeding the above-mentioned relative micromovements.

The inner ring may include radial slots that extend over at least a portion of its axial dimension and that are situated between the radially-inner ends of adjacent vanes. These slots serve to increase the effectiveness of the damping in vibratory modes of the vanes in twisting.

The invention also provides means for damping vibration in a nozzle stage as described above, the means comprising a sheet metal annular part of substantially C-shaped section that includes a radial slot extending over its entire axial dimension, and having its outside wall with radial notches or slots that define between the tabs that are elastically deformable in a radial direction, the inside wall being secured to an annular abradable-material support.

The invention also provides a turbine engine, such as an airplane turboprop or turbojet, the engine including at least one nozzle stage of the above-specified type.

BRIEF DESCRIPTION OF THE DRAWINGS

The present invention can be better understood and other details, characteristics, and advantages of the present invention appear more clearly on reading the following description, which is made by way of non-limiting example and with reference to the accompanying drawings, in which.

MORE DETAILED DESCRIPTION

Figure 1:
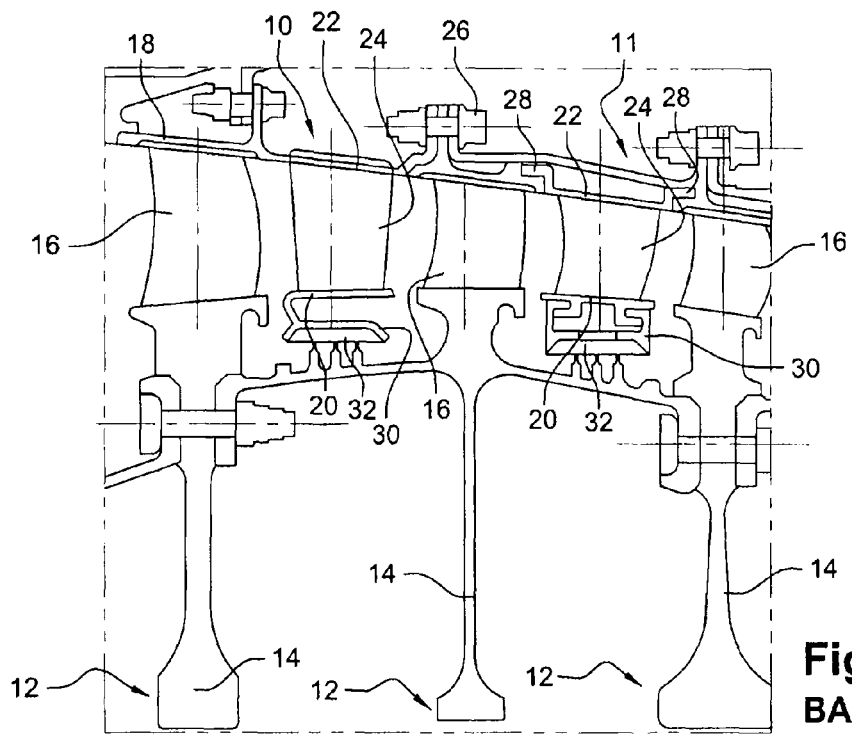
FIG. 1 is a fragmentary diagrammatic half-view in axial section of a turbine engine compressor having nozzle stages of the prior art.

Reference is made initially to FIG. 1, which shows a high pressure compressor of a turbine engine, such as an airplane turbojet or turbojet, the compressor comprising nozzle stages 10, 11 between which there are mounted stages 12 of moving blades.

Each stage 12 of moving blades comprises a disk 14 carrying an annular row of substantially radial blades 16 at its periphery surrounded by a casing 18 of the compressor.

Each nozzle stage 10 comprises two rings, respectively an inner ring 20 and an outer ring 22, between which there extends an annular ring of substantially radial vanes 24, the outer ring 22 being fastened to the casing 18 by nut-and-bolt type means 26 or by attachment means 28.

The inner ring 20 is securely connected to an annular element 30 for supporting abradable material 32. The annular element 30 of the nozzle stage 10 in this example is made integrally with the inner ring 20 of said stage, and the annular element 30 of the nozzle stage 11 is a separate piece that is fastened to the inner ring 20 of said stage by attachment means.

According to the present invention, damper means for damping vane vibration are fastened to an annular abradable-material support and are mounted with prestress on the inner ring of the nozzle stage in order to dissipate a portion of the vibration energy by friction against the inner ring.

In the embodiment shown in FIGS. 2 to 6, the damper means comprise an annular part 140 made of sheet metal and having a section that is substantially C-shaped with its opening facing downstream, and comprising two substantially cylindrical annular walls, respectively an inside wall 142 and an outside wall 144, which walls are parallel to the axis of the nozzle.

The nozzle stage 110 includes the inner ring 120 and the outer ring 122, and the sheet-metal part 140 is housed in an annular cavity 145 of the inner ring 120 of the nozzle stage 110, this cavity 145 being radially open towards the inside. By way of example, this part 140 is made of a metal alloy based on cobalt and its walls present a thickness of less than 1 millimeter (mm), e.g. lying in the range approximately 0.6 mm to 0.8 mm. The cavity 145 presents a radial dimension of the order of 8 mm to 10 mm, for example.

The sheet metal 140 is split and advantageously includes a radial slot 141 that extends over its entire axial dimension (FIG. 3), thereby enabling its diameter to be increased by moving apart the longitudinal edges of its slot.

The inside wall 142 of the part 140 is pressed against and fastened to an outer cylindrical surface of the annular abradable support 130, e.g. being fastened by brazing. The brazed connection may extend over substantially the entire axial dimension of the wall 142 and may be made using a metal sheet of brazing metal interposed between the outside wall 142 and the annular support 130.

The inside wall 142 of the part 140, when in a stress-free state, presents an inside diameter that is less than the outside diameter of the above-mentioned surface of the support 130 so as to be pressed against said surface with a certain amount of pressure.

The outside wall 144 of the part 140 is applied with pressure against the inside cylindrical surface of the inner ring 120 and can rub against this surface in operation in order to dissipate at least some of the vibration energy to which the vanes 124 are subjected. For this purpose, in the stress-free state, the outside wall 144 has an outside diameter that is greater than the inside diameter of the above-mentioned surface of the inner ring 120. The surface state of the contacting surfaces of the part 140 and of the inner ring 120 is such that each of them presents, for example, an Ra value of 1.6 micrometers (μm) (Ra: arithmetic mean difference).

In the example shown, the outside wall 144 has an upstream cylindrical portion 150 of smaller diameter and a downstream cylindrical portion 152 of greater diameter, these two portions being connected together by a frusto-conical portion 154 sloping outwards from upstream to downstream. The downstream end 156 of the outside wall 144 is folded and curved radially inwards so as to form means for bearing axially on the inner ring 120.

Figure 3:
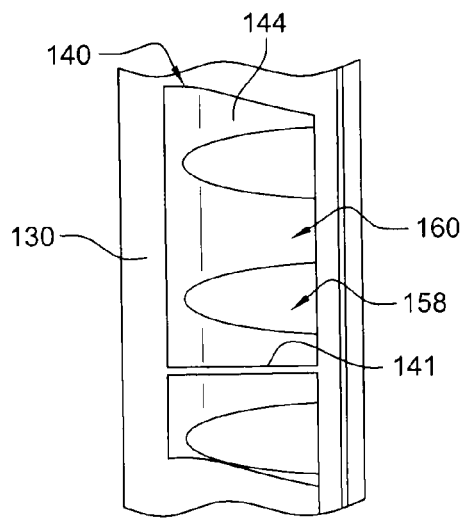
FIG. 3 is a fragmentary diagrammatic view in plan of the damper means and of the abradable-material support of the nozzle stage of FIG. 2.

As can be seen in FIG. 3, the outside wall 144 of the part 140 has a plurality of radial notches 158 in a festooned configuration, which notches are regularly distributed around the axis of revolution of the wall and define between them tabs 160 for bearing and rubbing against the inner ring.

The inner ring 120 has a section that is substantially L-shaped and it has a cylindrical wall that is connected at its upstream end to a radial wall that extends inwards. The cylindrical wall of the ring 120 defines the above-mentioned bearing and rubbing surface for the sheet metal part 140.

Figure 2:
FIG. 2 is a fragmentary diagrammatic half-view in axial section of a nozzle stage of the invention.
Figure 5:
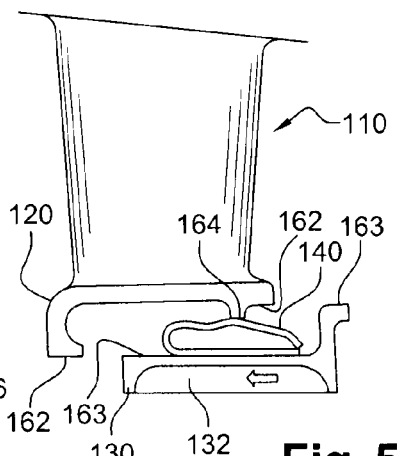

At the radially inner end of its radial wall and level with its downstream end, the inner ring 120 has cylindrical bearing surfaces 162 for centering purposes that are designed to co-operate with complementary cylindrical bearing surfaces 163 of the support 130 (FIGS. 2 and 5).

Adjacent to its downstream end, the inner ring 120 also includes a radially-inner annular rim or shoulder 164 having an upstream face that is designed to come into abutment against the end 156 of the sheet metal part in order to block the abradable support 130 in the downstream direction relative to the inner ring 120.

In section, the support 130 is substantially L-shaped and it has a cylindrical wall that is connected at its downstream end to a radial wall that extends outwards. The cylindrical wall of the support 130 defines the above-mentioned surface for fastening the sheet metal part 140.

The upstream end of the cylindrical wall of the support 130 forms the above-mentioned centering bearing surface 163, and the radially outer end of its radial wall includes the other centering bearing surface 163 and is also pressed against the downstream face of the shoulder 164 of the inner ring 120 in order to block the support upstream relative to the inner ring 120.

The support 130 carries an abradable material 132 that may be fastened by brazing to a radially-inside surface of the support or that may be formed by being sprayed onto said surface.

The support 130 is a single piece and the inner ring 120 may include axial slots between the vanes.

Anti-rotation means (not shown) for preventing the support 130 for rotating relative to the ring 120 are mounted by way of example at the downstream ends of the support and of the ring. These anti-rotation means are designed to withstand the tangential forces that are applied by the rotor and to allow relative micro-movements in operation. For this purpose, a small amount of circumferential clearance may be provided at the anti-rotation means.

Figure 4:
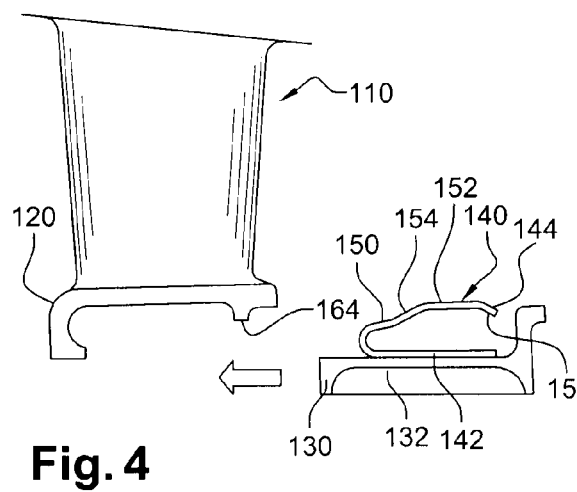
FIGS. 4 to 6 are diagrammatic views corresponding to FIG. 2 and showing the steps of mounting the damper means of the nozzle stage.
Figure 6:
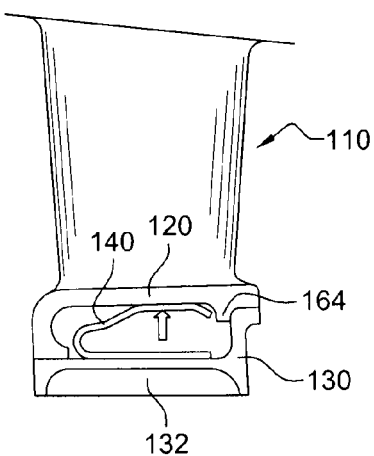

FIGS. 4 to 6 show the steps of mounting the nozzle stage 110 of the invention, and more particularly mounting the support 130 in the inner ring 120. The damper part 140 is secured to the support 130 which is mounted in the ring 120 by being moved axially upstream in translation (FIG. 4). The upstream cylindrical portion 150 of the part 140 advantageously has an outside diameter that is less than the diameter of the inner shoulder 164 of the ring 120 so as to avoid impeding this movement. The shoulder 164 of the ring 120 is designed to bear against the sloping portion 154 of the part 140 and to urge it radially inwards as the part 140 and the support 130 are moved upstream. The sloping portion 154 forms a ramp that enables the shoulder 164 to slide on said portion until the shoulder bears against the greater-diameter downstream portion 152 of the part 140. This leads to elastic deformation of the outside wall 144 of the part 140, which is pushed radially inwards (FIG. 5). The movement in axial translation of the support 130 is continued until the downstream end 156 of the part 140 passes (upstream) axially beyond the shoulder 164 of the inner ring 120. The outside wall 144 then deploys radially outwards and comes to bear against the inside surface of the inner ring (FIG. 6). In this mounting position, the downstream end of the annular support 130 bears against the downstream face of the shoulder 164 and axial clearance may exist between the downstream end 156 of the part 140 and the upstream face of the shoulder against which said end may come into abutment.

Figure 7:
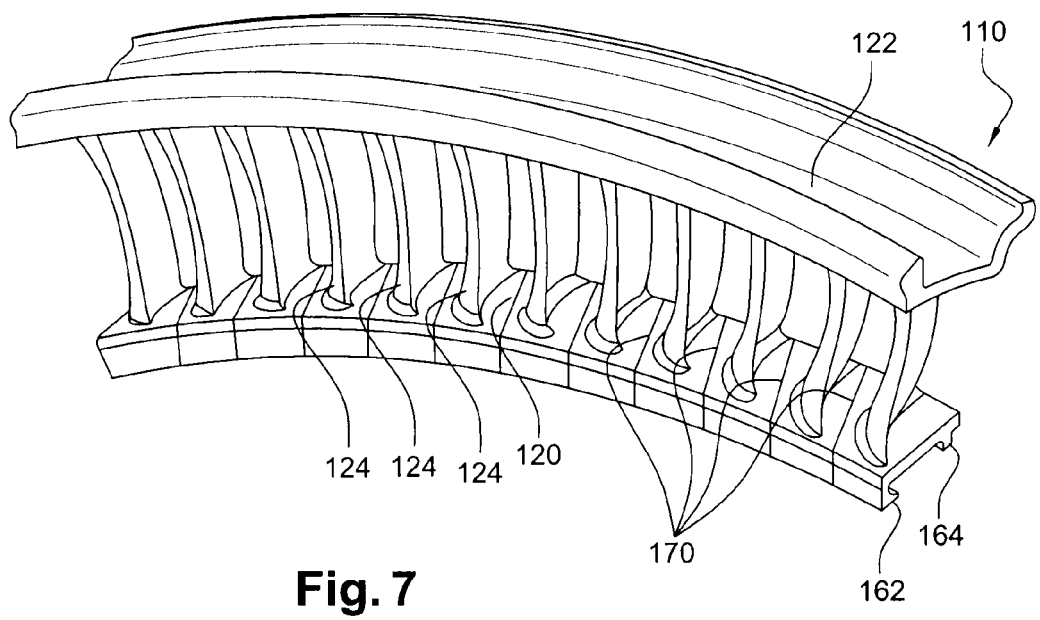
FIG. 7 is a diagrammatic perspective view of a portion of the FIG. 2 nozzle stage.

As shown in FIG. 7, the inner ring 120 may include radial slots 170 extending over part or all of the axial dimension of the ring. Each slot 170 extends between the radially inner ends of two adjacent vanes 124. The number of slots 170 may be equal to or less than the number of vanes 124. Two consecutive slots 170 may for example be spaced apart from each other by the inside ends of two, three, or four vanes 124. These slots 170 serve to increase the effectiveness with which vibratory modes in torsion of the vanes 124 are damped.

What is claimed is:

1. A compress nozzle stage for a turbine engine, the compressor nozzle stage having an axis, an upstream side receiving gas to circulate in the compressor nozzle, and a downstream side, and comprising:
    a plurality of vanes extending substantially radially around said axis, between a radially inner ring and a radially outer ring,
    an annular support of abradable material that is fixed with the radially inner ring,
    an abradable material fixed with the annular support, and a damper to damp vibration by friction, the damper being interposed between the radially inner ring and the annular support, wherein:

the radially outer ring is non-sectorized, the radially inner ring has a cylindrical wall extending at an upstream end in a radially inward wall, so that said radially inner ring has a section that is substantially L-shaped, the annular support has a cylindrical wall extending at a downstream end in a radially outward wall, so that said annular upport has a section that is substantially reverse L-shaped which closes an annular cavity downstream and radially inward, the damper is disposed within said closed annular cavity and comprises a sheet metal part of section that has an open downstream substantially C-shape, a substantially cylindrical outer wall and a substantially cylindrical inner wall, both substantially parallel to the axis of the nozzle, the substantially cylindrical inner wall being fixed with the annular support and the substantially cylindrical outer wall being pressed against the radially inner ring cylindrical wall, the sheet metal part being elastically deformable in a radial direction, the radially outward wall of the annular support abuts upstream in a direction substantially parallel to the axis against a downstream surface of at least one of an annular rim and a shoulder extending within said closed annular cavity radially inwards from the radially inner ring cylindrical wall, an end of the sheet metal part is abutable, within said closed annular cavity and in said direction substantially parallel to the axis, against an upstream surface of said at least one of the annular rim and the shoulder, to block the annular support downstream relative to the radially inner ring, and the radially inner ring has centering cylindrical bearing surfaces extending substantially parallel to said axis, at axial upstream and axial downstream ends, the centering cylindrical bearing surfaces bearing against complementary cylindrical bearing surfaces of the annular support extending substantially parallel to said axis, to guide in said direction substantially parallel to the axis, a translation of the annular support along the radially inner ring, before fixing the annular support and the radially inner ring together.

2. A nozzle stage according to claim 1, wherein the substantially cylindrical outer wall includes at least one of radial notches and slots that are regularly distributed around the axis of the nozzle, and that define between the at least one of the radial notches and the slots tabs to bear and rub against the radially inner ring.

3. A nozzle stage according to claim 1, wherein the sheet metal part has an overall axial dimension and includes at least one radial slot extending over said overall axial dimension, the sheet metal part having a radially inside diameter, when in a non-stressed state, that is less than a radially outside diameter of the annular support.

4. A nozzle stage according to claim 1, wherein the damper is fastened by brazing, welding, or adhesive to the annular support.

5. A nozzle stage according to claim 1, wherein the radially inner ring includes radial slots that extend over at least a portion of an axial dimension and that are situated between radially-inner ends of adjacent vanes of said plurality of vanes.

6. A nozzle stage according to claim 1, wherein the damper forms a resilient snap-fastener in said dosed annular cavity.

7. A vibration damper for a nozzle stage according to claim 1, wherein the vibration damper has an overall axial dimension and the sheet metal annular part includes a radial slot extending over said overall axial dimension, said sheet metal annular part having:

an outside wall including at least one of radial notches and radial slots delimiting elastically-deformable tabs, and an inside wall secured to an annular support.

8. A turbine engine including at least one nozzle stage according to claim 1.

* * * * *

UNITED STATES PATENT AND TRADEMARK OFFICE
CERTIFICATE OF CORRECTION

| | | |
|---|---|---|
| PATENT NO. | : 9,644,640 B2 | Page 1 of 1 |
| APPLICATION NO. | : 13/362464 | |
| DATED | : May 9, 2017 | |
| INVENTOR(S) | : Patrick Edmond Kapala | |

It is certified that error appears in the above-identified patent and that said Letters Patent is hereby corrected as shown below:

In the Specification

In Column 8, Line 28, "dosed" should read --closed--.

Signed and Sealed this
Eighth Day of May, 2018

Andrei Iancu
*Director of the United States Patent and Trademark Office*